United States Patent [19]

Suzuki

[11] Patent Number: 5,273,187

[45] Date of Patent: Nov. 28, 1993

[54] DISPENSER

[75] Inventor: Takanori Suzuki, Shizuoka, Japan

[73] Assignee: Tenryu Technics Co., Ltd., Shizuoka, Japan

[21] Appl. No.: 902,710

[22] Filed: Jun. 23, 1992

[30] Foreign Application Priority Data

Jul. 1, 1991 [JP] Japan .................. 3-160267

[51] Int. Cl.$^5$ .............................. B67D 5/22
[52] U.S. Cl. ........................ 222/51; 73/307; 116/204; 116/110
[58] Field of Search ........... 222/40, 41, 47, 51; 116/110, 204; 73/314, 307

[56] References Cited

U.S. PATENT DOCUMENTS

| | | | |
|---|---|---|---|
| 3,834,586 | 9/1974 | Wilhelmson | 222/47 |
| 4,881,088 | 11/1989 | Fisher et al. | 222/51 |
| 4,889,442 | 12/1989 | Takagi et al. | 222/51 |

Primary Examiner—H. Grant Skaggs

[57] ABSTRACT

A dispenser wherein a predetermined amount of a dispensing material within a syringe barrel is dispensed from a nozzle thereof by sliding axially a plunger to a prescribed distance toward the nozzle, the plunger being housed in an axially displaceable manner within the syringe barrel, a magnet is fitted to the plunger, and a magnetic proximity sensor detects an axially displacement position of the magnet within the syringe barrel.

1 Claim, 1 Drawing Sheet

DISPENSER

BACKGROUND OF THE INVENTION

1. Field of the Invention

The present invention relates to a dispenser, and particularly to a technique which is effectively applicable to a dispenser which supplies a predetermined amount of cream solder for bonding a pellet onto a package or a lead frame in technologies of a semiconductor integrated circuit manufacturing device.

2. Prior Art

In a well known dispenser, a plunger is housed movably in an axial direction in a container of a material to be dispensed and shifts toward a nozzle by a predetermined distance to push a predetermined amount of the material so that it is ejected from the nozzle.

In an automatic assembly line using a dispenser of this kind, it is necessary to refill a dispensing material into a container or to exchange a container for new one, by detecting a remaining amount of material in the container before it is used up. In order to detect decrease of the dispensing material, there has been employed a method where decrease in the material is detected visually by an operator, or a method where use-up time is predicted based on a planed amount of the dispensing material.

However, such a production control employing the visual detection by an operator or the time prediction detecting method requires much effort and there is a fear that such unreliable detecting methods may lead to faulty products.

SUMMARY OF THE INVENTION

An object of the present invention is to provide a dispenser which can detect readily and reliably a residual amount of dispensing material.

A dispenser according to the present invention, in which a plunger housed movably in an axial direction in a container is shifted toward a nozzle provided to the container by a predetermined distance to push a dispensing material in the container so that a predetermined amount of the material is ejected from the nozzle, comprising a detected means formed in the plunger; and a position detecting means for detecting an axially displaced position of the detected means in the container.

The position detecting means may be arranged at a prescribed place without being in contact with the container, so as not to be deviated due to a movement of the container.

The detected means may be a magnet and the position detecting means may be a magnetic sensor which detect a magnetism from the magnet to recognize the position thereof.

Furthermore, the magnet may be arranged within the plunger.

Otherwise, the plunger itself may be formed of a magnetized material.

Instead, the plunger may be formed of a magnetic powder containing resin.

According to the dispenser of the present invention, the position detecting means detects a position of the detected means which travels axially within the container so that an amount of the dispensing material remaining in the container can be detected. Thus, detection can be made readily and reliably.

Further, if the position detecting means is arranged in a prescribed place without contacting the side of the container so as not to be affected by the movement of the container, it is not needed to provide a space for a swinging wire, which is required when the position detecting means is connected to the container and a wire extends from the position detecting means. Also, it is reliably prevented that the wire of the position detecting means is broken by the swing thereof when the container is moved vertically or rotationally. Further, weight increase on the side of the container can be prevented because the position detecting means is not connected to the container.

When the detected means is a magnet and the position detecting means is a magnetic sensor for detecting a position of the magnet by sensing its magnetism, a simplified structure consisting only of the magnet and the magnetic sensor can realize easy and reliable detection of the remaining amount of the dispensing material.

Furthermore, when the magnet is arranged within the plunger, the plunger protects the magnet from sliding against the inner surface of the container, and therefore, wear powder and the like caused by the slide of the magnet can be prevented reliably from being produced.

When the plunger is formed of a magnetized material, it is not needed to assemble a magnet within the plunger. For that reason, the number of parts can be decreased and the dispenser assembling process can be simplified.

Such a plunger structure can be readily obtained by using a magnetic powder containing resin.

BRIEF DESCRIPTION OF THE DRAWINGS

The above and other objects and features of the present invention will become more apparent when referred to the following descriptions given in conjunction with the accompanying drawing.

DETAILED DESCRIPTION OF THE PREFERRED EMBODIMENT

Figure 1:
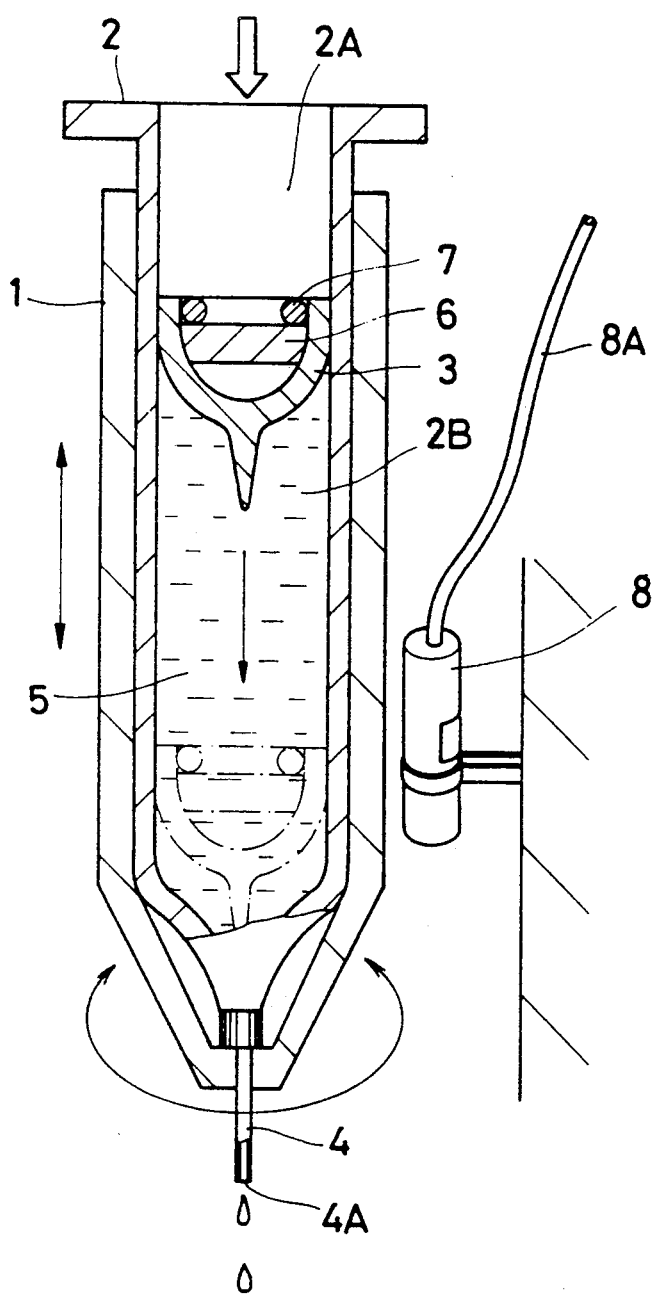
FIG. 1 is a cross sectional view showing a dispenser being an embodiment according to the present invention.

Referring to the drawing, a dispenser according to the present embodiment has a protective sleeve 1 of a non-magnetic material such as resin, a syringe barrel (container) 2, a plunger 3, and a twin needle 4 made of metal etc.

The syringe barrel 2 is inserted and fixed coaxially in the protective sleeve 1. The plunger 3 is accommodated within the syringe barrel 2 so as to move in the axial direction of the syringe barrel 2.

The plunger 3 divides the syringe barrel 2 into a working fluid chamber 2A and a storage chamber 2B filled with a dispensing material 5. When the plunger 3 is traveled to a predetermined amount of displacement toward the nozzle 4A of the needle 4 by pneumatic pressure such as pulse air introduced into the working fluid chamber 2A, a predetermined amount of dispensing material in the storage chamber 2B is dispensed out of the nozzle 4A.

As a dispensing material 5, are exemplified paste material including adhesives, conductive pastes, cream solder and the like; fluid material including lubricant oils, chemicals, foods, paints and the like; and solid material including wax, hot melt or the like.

As dispensing patterns of dispensing material 5, are exemplified dripping, multi-point dispensing, straight coating, and circular coating. Such various dispensing patterns are effectuated by vertical and/or rotational movement of the syringe barrel 2 or of the workpiece (not shown).

The dispensing amount can be adjusted by selecting dispensing time, air pressure in the working fluid chamber 2A, or the diameter of the nozzle A.

Next, according to the dispenser of the present invention, a disk magnet (detected means) 6 is inserted coaxially into the inner space of the plunger 3 and fixed by a fixing member 7 in a ring shape.

The magnetic proximity sensor 8 (position detecting means) is arranged near to the outer surface of the protective sleeve 1 and not in contact with the syringe barrel 2, so as not to be affected and shifted by the displacement of the syringe barrel 2, or the vertical or rotational movement thereof.

The magnetic proximity sensor 8 detects a displacement position of the magnet 6 in the syringe barrel 2 along its axis through the magnetism of the magnet 6, thus finding a remaining amount of the dispensing material 5.

According to the present embodiment, as shown by one dot line in FIG. 1, when both plunger 3 and the magnet 6 descend to a point being near to the needle 4 and the magnetic proximity sensor 8, the magnetic proximity sensor 8 detects the position of the magnet 6 by detecting the magnetism therefrom, thus recognizing that the dispensing material 8 has been reduced to a prescribed value. In accordance with this detection, an operator refills new dispensing material 5 into the syringe barrel 2, or exchanges it for a new syringe barrel 2.

A wire 8A used for the position sensing extends from the magnetic proximity sensor 8 and is connected to a prescribed control unit.

Next, the operation of the present embodiment will be explained below.

For example, when a pneumatic pressure such as pulse air is introduced into the operating fluid chamber 2A, the plunger 3 is moved by a prescribed distance toward the nozzle 4A of the needle 4. As a result, a prescribed amount of the dispensing material 5 within the storage chamber 2B is dispensed out of the nozzle 4A to be supplied to a prescribed place of a prescribed workpiece (not shown).

In some cases, the syringe barrel 2 is moved vertically or rotatably by means of a driving mechanism (not shown) to supply the dispensing material 5 to a workpiece (not shown). In another case, the workpiece itself is moved in a prescribed manner to receive the dispensing material 5.

In the manner described above, as the dispensing material 5 is supplied sequentially onto a workpiece, and its volume in the syringe barrel 2 is reduced, both the plunger 3 and the magnet 6 go down axially within the syringe barrel 2, to gradually approaches the needle 4 or the magnetic proximity sensor 8.

Then, when both the plunger 3 and the magnet 6 have descended to the point shown in one dot and broken line in FIG. 1, the magnetic proximity sensor 8 senses the magnetism from the magnet 6, thus detecting the position thereof. And with this detection, it is recognized that the remaining amount of the dispensing material 5 has been reduced to a specified level. Upon the detection, an operator can refill the dispensing material into the syringe barrel 2 or can exchange it for a new syringe barrel 2.

Therefore, according to the dispenser of the present invention, as described above, the magnetic proximity sensor 8 detects a displacement position of both the plunger 3 and the magnet 6 within the syringe barrel 2 along the axis, hence, the remaining amount of the dispensing material 5 in the syringe barrel 2 can be detected through this displacement position of both the plunger 3 and the magnet 6, whereby it is possible to detect readily and reliably the remaining amount of the dispensing material.

Also, the magnetic proximity sensor 8 is arranged at a prescribed position but not in contact with the syringe barrel 2, so as not to be affected by the movement of the syringe barrel 2. For that reason, even when the syringe barrel 2 moves vertically or rotatably and a wire 8A for position sensing extends outward from the magnetic proximity sensor 8, it is unnecessary to keep a space for the sling of the wire 8A caused by the movement of the syringe barrel 2. This prevent breakage of the wire 8A due to a sling thereof and a mass increase of the movable portion on the side of the syringe barrel 2 caused by mounting the magnetic proximity sensor 8 thereon.

Further, according to the present embodiment, the simplified structure comprising a magnet 6 arranged in the plunger 3 and a magnetic proximity sensor 8 for detecting a magnetism from the magnet 6 enables an easy and accurate detection of a remaining amount of the dispensing material 5.

Since the magnet 6 is arranged in the plunger 3 which prevents the magnet 6 from sliding against the inner wall surface of the syringe barrel 2, it is possible to prevent producing abrasion powder due to the sliding motion of the magnet 6.

As described above, the invention made by the present inventor has been explained in accordance with the embodiment. However, it should not be limited to the embodiment of the present invention, and needless to say that various modifications can be made without departing from the scope of the invention.

The present embodiment employs a structure wherein the magnet 6 is arranged in the plunger 3. However, for example, it is possible to employ a structure wherein the magnetic proximity sensor 8 detects a magnetism from the plunger 3 which is made of a resin containing magnetic powder so as to be magnetized itself.

Such a structure does not require the process for assembling the magnet 6 into the plunger 3, so that it is possible to reduce the number of parts and to ease the assembly processes for the dispenser.

In the present invention, any type of switch including contact type reed switch and contactless type reed switch can be used for the magnetic proximity sensor 8.

Also, a twin needle 4 is used in the above embodiment, however, for example, a single needle can be used in the present invention.

In the dispenser structure according to the present invention, the position detection means detects a displacement position of the detected means which slides axially in a container to find a remaining amount of the dispensing material, the remaining amount of the dispensing material can be detected readily and reliably.

As described above, the position detection means is arranged at a prescribed place and not in contact with the container so as not to be affected by the movement of the container. Hence, when the container moves vertically or rotatably, even if a wire for position detection is extending from the position detection means, any space for the sling of the wire is not required, and also the wire breakage due to the sling can be prevented reliably. Furthermore, the position detecting means is not mounted on the side of the container moved, so that mass increase on the side of the container can be prevented.

As described above, the detected means is a magnet, and the position detecting means is a magnetic sensor for detecting a position of the magnet by sensing a magnetism thereof. For that reason, the simplified structure comprising a magnet and a magnetic sensor can detect easily and certainly a remaining amount of the dispensing material.

As described above, since the structure is such that a magnet is arranged in the plunger, it can prevent generation of abrasion powder due to the slide of the magnet because the plunger prevents the magnet from sliding against the inner wall surface of the container.

As described above, when the plunger itself is made of a magnetized material, it is unnecessary to assemble a magnet into the plunger. This structure allows to reduce the number of parts and to ease the assembly processes of the dispenser. A plunger of the above structure can be obtained readily by making it with resin containing magnetic powder.

What is claimed is:

1. A dispenser for dispensing a predetermined amount of bonding material used for surface mounting of a semiconductor device, comprising:
   a container having a nozzle and containing a bonding material;
   a plunger which is at least partially hollow on a side thereof opposite said bonding material, said plunger being housed within said container and displaceable in an axial direction of the container, said plunger being moved a prescribed length toward the nozzle and pushing the bonding material out of the nozzle to dispense a prescribed amount of the material;
   an indicator means in said plunger; and
   a position detecting means for detecting the position of said indicator means which moves axially within said container,
   said indicator means being a magnet arranged within said hollow plunger and secured by a fixing member on the side thereof opposite said bonding material, and said position detecting means responding to magnetism from the magnet to detect a position of the indicator means.

* * * * *